United States Patent
Ikeda et al.

(10) Patent No.: US 9,026,050 B2
(45) Date of Patent: May 5, 2015

(54) COMMUNICATION CIRCUIT (71) Applicant: Murata Manufacturing Co., Ltd., Nagaokakya-shi, Kyoto-fu (JP)

(72) Inventors: Naoto Ikeda, Nagaokakyo (JP); Nobuo Ikemoto, Nagaokakyo (JP); Naoki Gouchi, Nagaokakyo (JP); Toshiyuki Nakaiso, Nagaokakyo (JP); Katsumi Taniguchi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/255,999

(22) Filed: Apr. 18, 2014

(65) Prior Publication Data
US 2014/0227978 A1 Aug. 14, 2014

(30) Foreign Application Priority Data

Oct. 26, 2011 (JP) .................................. 2011-234601

(51) Int. Cl.
*H04B 5/00* (2006.01)
*H04B 5/02* (2006.01)
*H01Q 7/00* (2006.01)
*G06K 19/07* (2006.01)
*H01Q 1/22* (2006.01)

(52) U.S. Cl.
CPC .. *H04B 5/02* (2013.01); *H01Q 7/00* (2013.01); *G06K 19/0726* (2013.01); *H01Q 1/2225* (2013.01); *H04B 5/0062* (2013.01); *H04B 5/0081* (2013.01)

(58) Field of Classification Search
CPC ... G06K 19/0726; H01Q 1/2225; H01Q 7/00; H04B 5/0062; H04B 5/02
See application file for complete search history.

(56) References Cited

U.S. PATENT DOCUMENTS

| 4,973,979 A | 11/1990 | Ikeda | |
|---|---|---|---|
| 5,694,949 A * | 12/1997 | Reggiardo | .................. 128/897 |
| 5,716,381 A * | 2/1998 | Reggiardo | ...................... 607/8 |
| 2005/0227627 A1* | 10/2005 | Cyr et al. | ................. 455/67.11 |

(Continued)

FOREIGN PATENT DOCUMENTS

| CN | 101313475 A | 11/2008 |
|---|---|---|
| JP | 01-164125 A | 6/1989 |

(Continued)

OTHER PUBLICATIONS

Official Communication issued in International Patent Application No. PCT/JP2012/077552, mailed on Jan. 29, 2013.

(Continued)

*Primary Examiner* — Zhiyu Lu
(74) *Attorney, Agent, or Firm* — Keating & Bennett, LLP (57) ABSTRACT

In a communication circuit, an RFIC includes an IO terminal and a control IC includes an IO terminal. A variable capacitance element includes control terminals, a capacitance element with a capacitance value that is determined according to a control voltage, and a resistance voltage divider circuit configured to generate the control voltage by dividing a voltage inputted to the control terminals. One of the RFIC and the control IC supplies control data to the variable capacitance element via a signal line. The variable capacitance element, along with an antenna coil, constitutes an antenna circuit of an LC parallel resonance circuit, and sets a resonant frequency of the antenna circuit to be a predetermined frequency.

18 Claims, 10 Drawing Sheets

(56) References Cited

U.S. PATENT DOCUMENTS

| | | | |
|---|---|---|---|
| 2005/0258966 A1* | 11/2005 | Quan | 340/572.7 |
| 2006/0018082 A1 | 1/2006 | Yamagata et al. | |
| 2006/0030277 A1 | 2/2006 | Cyr et al. | |
| 2006/0220863 A1 | 10/2006 | Koyama | |
| 2007/0222605 A1* | 9/2007 | Andresky | 340/572.7 |
| 2007/0229273 A1* | 10/2007 | Hoemann et al. | 340/572.4 |
| 2007/0242651 A1* | 10/2007 | Hayem et al. | 370/342 |
| 2007/0285326 A1* | 12/2007 | McKinzie | 343/746 |
| 2008/0012712 A1* | 1/2008 | Shimizu | 340/572.5 |
| 2008/0090540 A1* | 4/2008 | Rofougaran | 455/289 |
| 2008/0272851 A1* | 11/2008 | Lin et al. | 331/115 |
| 2008/0299930 A1* | 12/2008 | Rofougaran et al. | 455/275 |
| 2008/0312857 A1* | 12/2008 | Sequine | 702/65 |
| 2009/0248925 A1* | 10/2009 | Guan et al. | 710/67 |
| 2009/0295543 A1 | 12/2009 | Kita | |
| 2010/0156574 A1 | 6/2010 | Nohara | |
| 2011/0009173 A1* | 1/2011 | Kumamoto | 455/574 |
| 2011/0059694 A1* | 3/2011 | Audic | 455/41.1 |
| 2011/0165838 A1* | 7/2011 | Rofougaran | 455/41.1 |
| 2011/0273361 A1* | 11/2011 | Autti | 343/904 |

FOREIGN PATENT DOCUMENTS

| | | |
|---|---|---|
| JP | 2005-064437 A | 3/2005 |
| JP | 2006-049840 A | 2/2006 |
| JP | 2006-295905 A | 10/2006 |
| JP | 2009-111483 A | 5/2009 |
| JP | 2009-290644 A | 12/2009 |
| JP | 2010-147743 A | 7/2010 |
| JP | 2010-171551 A | 8/2010 |
| JP | 2011-078040 A | 4/2011 |
| JP | 2011-135447 A | 7/2011 |
| JP | 2011-142384 A | 7/2011 |

OTHER PUBLICATIONS

Official Communication issued in corresponding Japanese Patent Application No. 2014-081604, mailed on Dec. 9, 2014.

* cited by examiner

COMMUNICATION CIRCUIT

BACKGROUND OF THE INVENTION

1. Field of the Invention

The present invention relates to a communication circuit preferably for use in an RFID (Radio Frequency Identification) system or a near field communication (NFC: Near Field Communication) system, in which communication with a target device is performed by an electromagnetic field signal.

2. Description of the Related Art

NFC is one of the near field communication standards using a frequency band of 13 MHz, and expected to be applied to various terminals including mobile communication terminals. A mobile communication terminal using NFC typically has an RFIC for NFC built in a main body of the terminal, and the RFIC for NFC is connected to an antenna coil for NFC that is also built within the terminal main body. Further, the antenna coil is connected to a capacitance element so as to resonate at a communication frequency, and the capacitance element and the antenna coil constitute an antenna circuit. In addition, the antenna circuit and the RFIC for NFC or the like constitute a wireless communication module (hereinafter referred to as "NFC module").

While a communication frequency for the NFC module is previously determined, a resonant frequency to which the antenna circuit is to be tuned varies to some degree depending on its use conditions and a production tolerance. For example, circuit architecture of the antenna circuit as a resonance circuit is different between a reader/writer mode and a card mode. Accordingly, it is necessary to adjust the resonance circuit according to the mode so that a predetermined resonant frequency is maintained in both modes. Further, the use conditions change according to an environment in which the NFC module is installed. For example, the resonant frequency of the antenna circuit changes depending on whether or not there is metal near the NFC module.

If a frequency band of the antenna in the NFC module is sufficiently broad, fine adjustment due to the difference in the use conditions is not necessary. However, it has become difficult to ensure an adequate antenna size as recent terminals are increasingly downsized, and the antenna's bandwidth may not be broadened if the size of the antenna is small. Therefore, it is necessary to adjust the resonant frequency to obtain an optimal value.

As one method of adjusting the resonant frequency, there is known an antenna circuit including a capacitor configured by a variable capacitance element capable of changing a capacitance value by an applied voltage (see, for example, Japanese Patent Unexamined Publication No. 2009-290644). Alternatively, Japanese Patent Unexamined Publication No. 2010-147743 discloses a circuit that switches between entire capacitance values by selectively connecting a plurality of capacitors.

Figure 10:
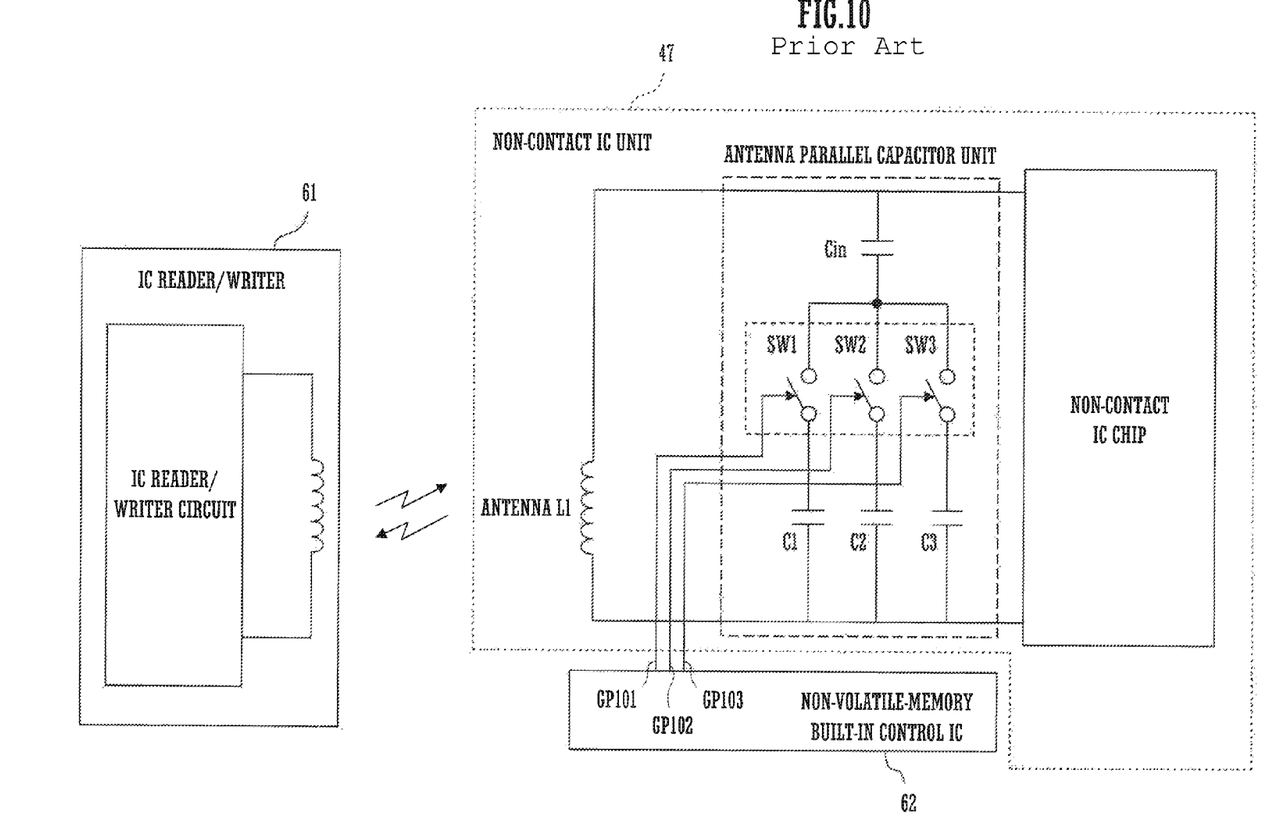
FIG. 10 is a circuit diagram of a communication circuit disclosed in Japanese Patent Unexamined Publication No. 2010-147743.

FIG. 10 is an example of a communication circuit disclosed in Japanese Patent Unexamined Publication No. 2010-147743. In the drawing, a non-contact IC unit 47 is configured by a non-contact IC chip, an antenna parallel capacitor unit having a capacitor Cin, parallel capacitors C1 to C3, and the switches SW1 to SW3, and an antenna L1. Values of electric capacitances of the capacitor Cin and the parallel capacitors C1 to C3 are static. The switches SW1 to SW3 are circuits for switching between ON and OFF of the parallel capacitors C1 to C3, respectively. After the non-contact IC unit 47 is incorporated in a mobile telephone 1, a control IC 62 having a non-volatile memory built in is connected to the non-contact IC unit 47. The control IC 62 controls the switches SW1 to SW3 of the non-contact IC unit 47 to switch between ON and OFF of the switches SW1 to SW3.

However, when a variable-capacitance diode and a switching circuit are provided, it is necessary to provide a space for mounting these active elements, and there is often a case in which the resonant frequency changes because distortion may easily occur since these elements are active elements. Further, terminals for receiving and transmitting signals and data for adjusting the resonant frequency of the antenna circuit, as well as lines for transmitting these signals and data, are required. In addition, a large number of capacitors and switches are necessary in order to adjust the capacitance value in fine steps by switching between the plurality of capacitors. This adversely complicates the circuit architecture, and increases the size of an IC.

SUMMARY OF THE INVENTION

Preferred embodiments of the present invention provide a communication circuit capable of adjusting a capacitance value of an antenna circuit without increasing the number of terminals configured to receive and transmit signals and data, the number of lines to transmit the signals and data, and the number of capacitance elements, thus greatly simplifying circuit architecture.

A communication circuit according to a preferred embodiment of the present invention includes an RFIC configured to perform modulation and demodulation between a baseband signal and a high-frequency signal; a control IC configured to control the RFIC by receiving and transmitting data including communication data; an antenna coil; and a variable capacitance element configured to change a resonant frequency of an antenna circuit including the antenna coil.

An IO terminal of the RFIC and an IO terminal of the control IC are connected by a signal line, and control terminals of the variable capacitance element are connected to at least a portion of the signal line.

With this configuration, it is possible to adjust a capacitance value of the variable capacitance element without increasing the number of terminals configured to receive and transmit signals and data, the number of lines to transmit the signals and data, and the number of capacitance elements, thus greatly simplifying the circuit architecture.

Preferably, the variable capacitance element includes a capacitance element with a capacitance value that is determined according to a control voltage, and a resistance voltage divider circuit configured to generate the control voltage by dividing a voltage inputted to the control terminals.

With this configuration, it is possible to adjust the capacitance value of the antenna circuit without increasing the number of capacitance elements, and thus to greatly simplify the circuit architecture.

Preferably, the resistance voltage divider circuit includes a plurality of resistances each including a first terminal connected to each of the control terminals; and a common line to which second terminals of the resistances are connected in common and through which the control voltage is outputted, and resistance values of the plurality of resistances are determined to be in a ratio based on powers of 2 based on a lowest value among the resistance values.

With this configuration, it is possible to achieve a linear relationship between values of the control data and the control voltage for the variable capacitance element with a relatively smaller number of lines (a number of bits) of data transmission lines, and to facilitate setting in multiple steps at constant resolution.

Preferably, the communication circuit further includes an external IO terminal connected to the signal line, and configured to receive and transmit a signal from and to an external circuit.

With this configuration, it is possible to control the variable capacitance element from the external circuit.

Preferably, the variable capacitance element and the RFIC are monolithically configured as a single monolithic IC.

With this configuration, the number of the components is reduced, wiring of the data transmission lines is simplified to a large extent, and thus the size and the weight of the communication circuit are significantly reduced.

Preferably, the RFIC includes an operational mode switch configured to switch an operational mode of the RFIC based on a signal outputted from the IO terminal of the control IC when the RFIC is turned on.

With this configuration, the IO port used by the control IC to control the RFIC and the output port for the control data to control the capacitance value of the variable capacitance element preferably is configured as the same port, and it is therefore possible to efficiently utilize a small number of IO ports.

Preferably, one of the RFIC and the control IC is configured to determine a capacitance setting mode of the variable capacitance element when power is turned on, and both of the RFIC and the control IC are configured to output control data for the variable capacitance element to the IO terminal.

With this configuration, it is possible to supply the control data to the variable capacitance element from either of the RFIC and the control IC, and thus to provide a highly sophisticated communication circuit.

According to various preferred embodiments of the present invention, it is possible to provide a communication circuit capable of adjusting a capacitance value of an antenna circuit without increasing the number of terminals configured to receive and transmit signals and data, the number of lines to transmit the signals and data, and the number of capacitance elements, thus greatly simplifying the circuit architecture.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
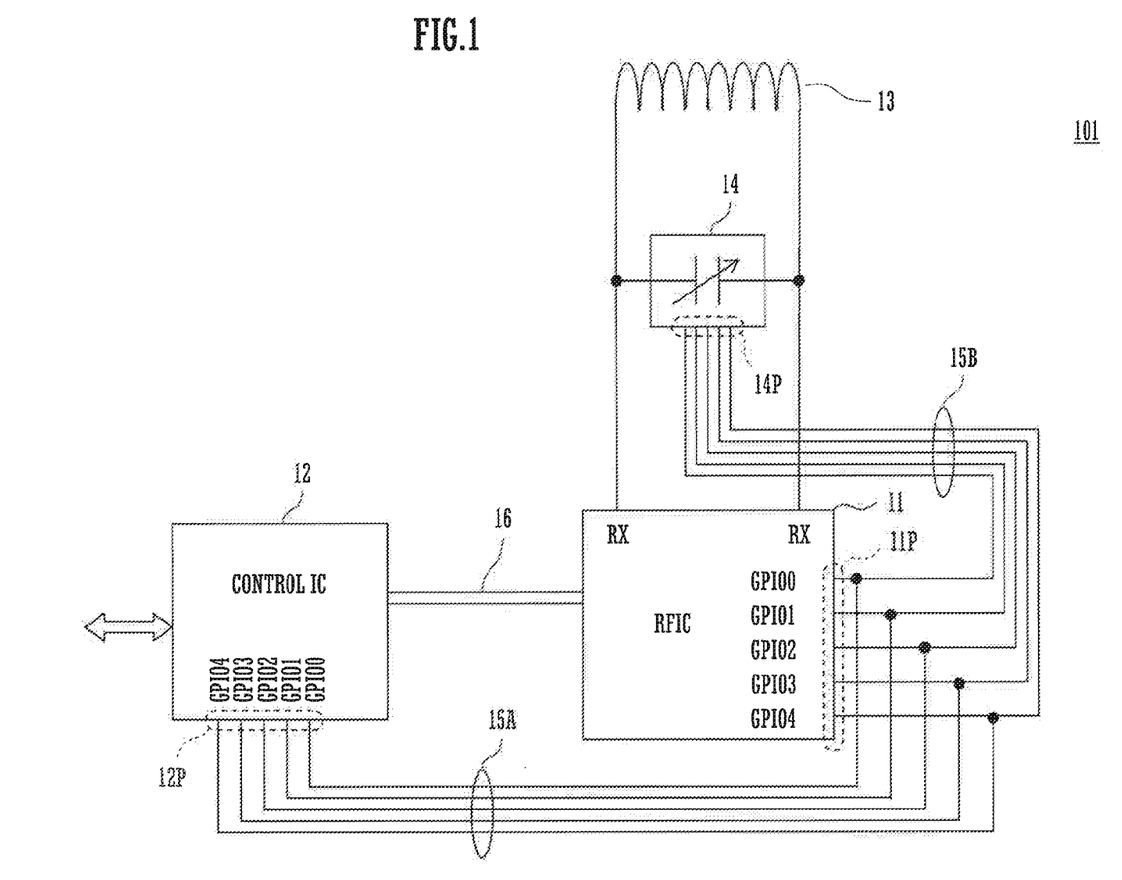
FIG. 1 is a circuit diagram of a communication circuit 101 according to a first preferred embodiment of the present invention.

FIG. 1 is a circuit diagram of a communication circuit 101 according to a first preferred embodiment of the present invention. The communication circuit 101 is one example of an NFC module described above. The communication circuit 101 preferably includes an RFIC 11, a control IC 12, an antenna coil 13, and a variable capacitance element 14. The RFIC 11 includes IO terminals 11P for GPIO (General Purpose Input/Output). Similarly, the control IC 12 includes IO terminals 12P for GPIO.

The RFIC 11 is programmed and configured to perform modulation and demodulation between a baseband signal and a high-frequency signal. The control IC 12 may be called a host IC. The control IC controls the RFIC 11, and receives and transmits data including communication data.

The variable capacitance element 14 includes control terminals 14P. The variable capacitance element 14 includes a capacitance element with a capacitance value that is determined according to a control voltage (bias voltage), and a resistance voltage divider circuit that generates the control voltage by dividing a voltage inputted to the control terminals.

The variable capacitance element 14 and the antenna coil 13 of a parallel circuit are connected to two RX terminals (received signal terminals) of the RFIC 11.

The IO terminals 11P of the RFIC 11 and the IO terminals 12P of the control IC 12 are connected by signal lines 15A, and the control terminals 14P of the variable capacitance element 14 are connected to at least a portion of the signal lines 15A and 15B. In the example shown in FIG. 1, the control terminals 14P are connected to all of the signal lines 15A and 15B.

Further, the RFIC 11 and the control IC 12 are connected via data transmission lines 16. For ports of the control IC 12 and the RFIC 11 for the data transmission lines 16, a UART (universal asynchronous receiver-transmitter circuit) preferably is provided, for example, and data is transmitted and received via the data transmission lines 16 based on a serial transfer method or a parallel transfer method.

As will be described later, the RFIC 11 and the control IC 12 receive and transmit communication signals via the data transmission lines 16. The control IC 12 controls various setting or the like for the RFIC 11 via the signal lines 15A. In addition, the RFIC 11 or the control IC 12 supplies control data to the variable capacitance element 14 via the signal lines 15A and 15B.

The variable capacitance element 14 and the antenna coil 13 constitute an antenna circuit which is an LC parallel resonance circuit, and determine a resonant frequency of the antenna circuit. The antenna coil 13 is coupled with an antenna of a communication destination by electromagnetic field coupling, and performs transmission and reception for short range communication.

Figure 2:
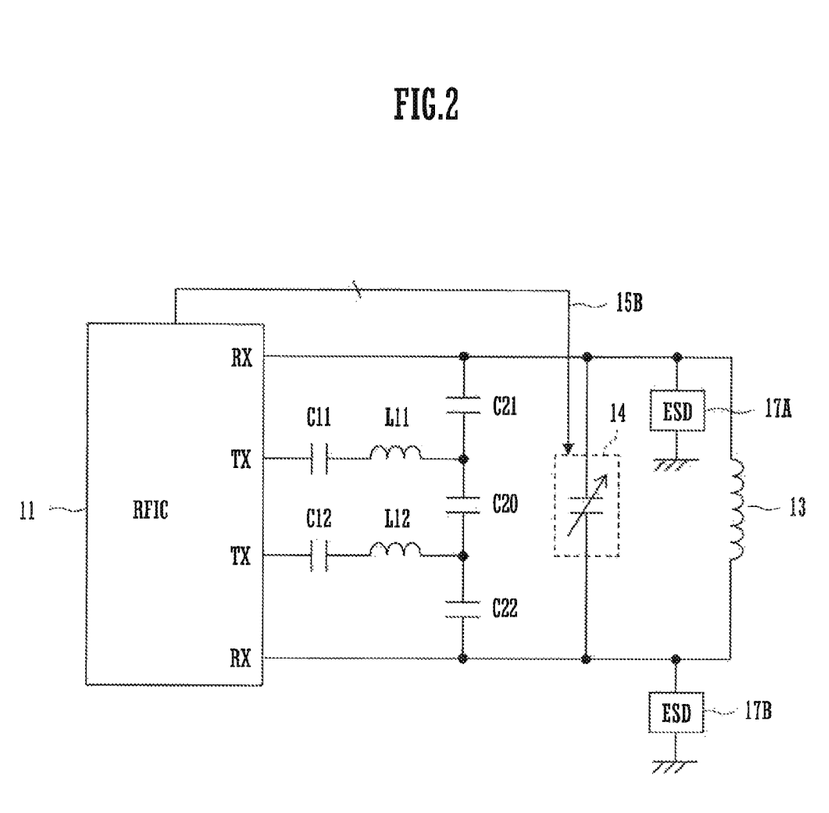
FIG. 2 is a detailed diagram of circuits provided between an RFIC 11 and an antenna coil 13.

FIG. 2 is a detailed diagram of circuit provided between the RFIC 11 and the antenna coil 13. In FIG. 2, a circuit connected to two TX terminals (transmitted signal terminal) of the RFIC 11 is also shown. Capacitors C21 and C22 in FIG. 2 are elements that are configured and arranged to adjust a degree of coupling between the RFIC 11 and the antenna coil 13. Further, the inductors L11 and L12 and the capacitors C11, C12, and C20 constitute a transmission filter. For example, as the RFIC 11 operates passively when the communication circuit operates in the card mode, the RFIC 11 generates a source voltage from an input signal inputted to the RX terminal and reads a reception signal, and performs load modulation of a circuit (load) connected to the TX terminal in transmission. Further, for example, since the RFIC 11 operates actively when the communication circuit operates in the reader/writer mode, the RFIC 11 opens the RX terminal to transmit a transmission signal from the TX terminal in transmission, and opens the TX terminal to receive a reception signal from the RX terminal in reception. In this manner, in the communication circuit, impedance from the RFIC 11 toward the antenna coil 13 changes depending on the operation mode. As will be later described, the variable capacitance element 14 is controlled so that the resonant frequency of the antenna circuit is optimized depending on the operation mode (so that the impedance from the RFIC 11 toward the antenna coil matches).

Here, the ESD protection elements 17A and 17B are connected between the ground and both end terminals of the antenna coil 13, respectively. The ESD protection elements 17A and 17B let an electrostatic discharge surge from the antenna coil 13 out to an electrostatic discharge surge to the ground to prevent an excess voltage from being applied to the RFIC 11.

Figure 3:
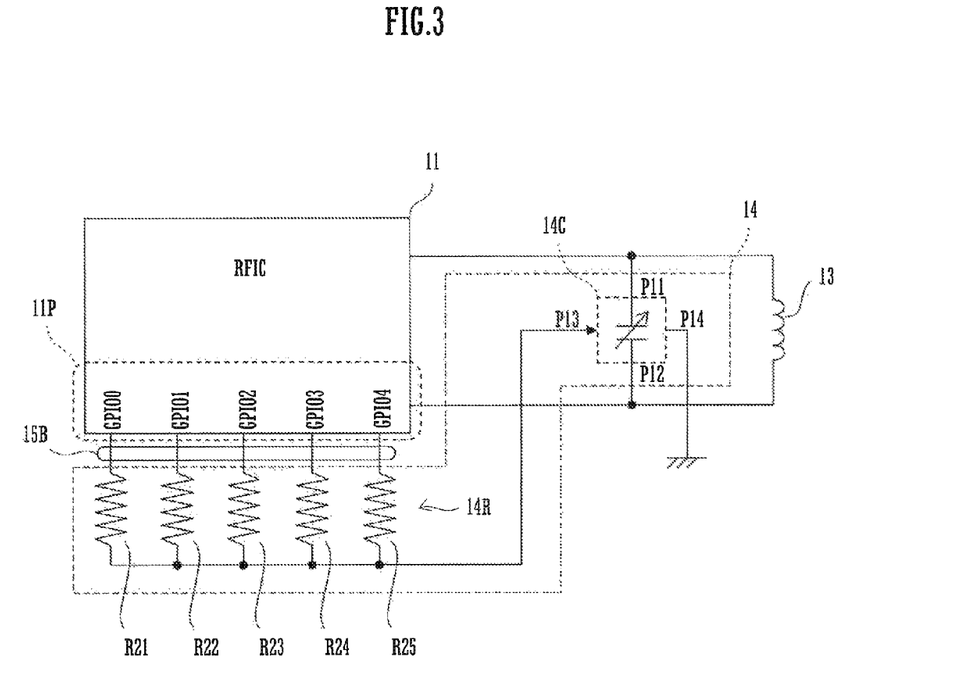
FIG. 3 is a diagram illustrating a general configuration of a variable capacitance element 14 along with circuits connected thereto.

FIG. 3 is a diagram illustrating a general configuration of the variable capacitance element 14 along with circuits connected thereto. Referring to FIG. 3, the variable capacitance element 14 includes a control voltage application circuit 14R and a variable capacitance unit 14C. A capacitance value between ports P11-P12 of the variable capacitance unit 14C is determined according to a voltage applied between ports P13-P14. The control voltage application circuit 14R preferably is configured by resistance elements R21-R25 each including a first terminal connected to a GPIO port (GPIO0-GPIO4) of the RFIC 11 and a second terminal connected in common. The lines in common connection are connected to the port P13 of the variable capacitance unit 14C.

Figure 4:
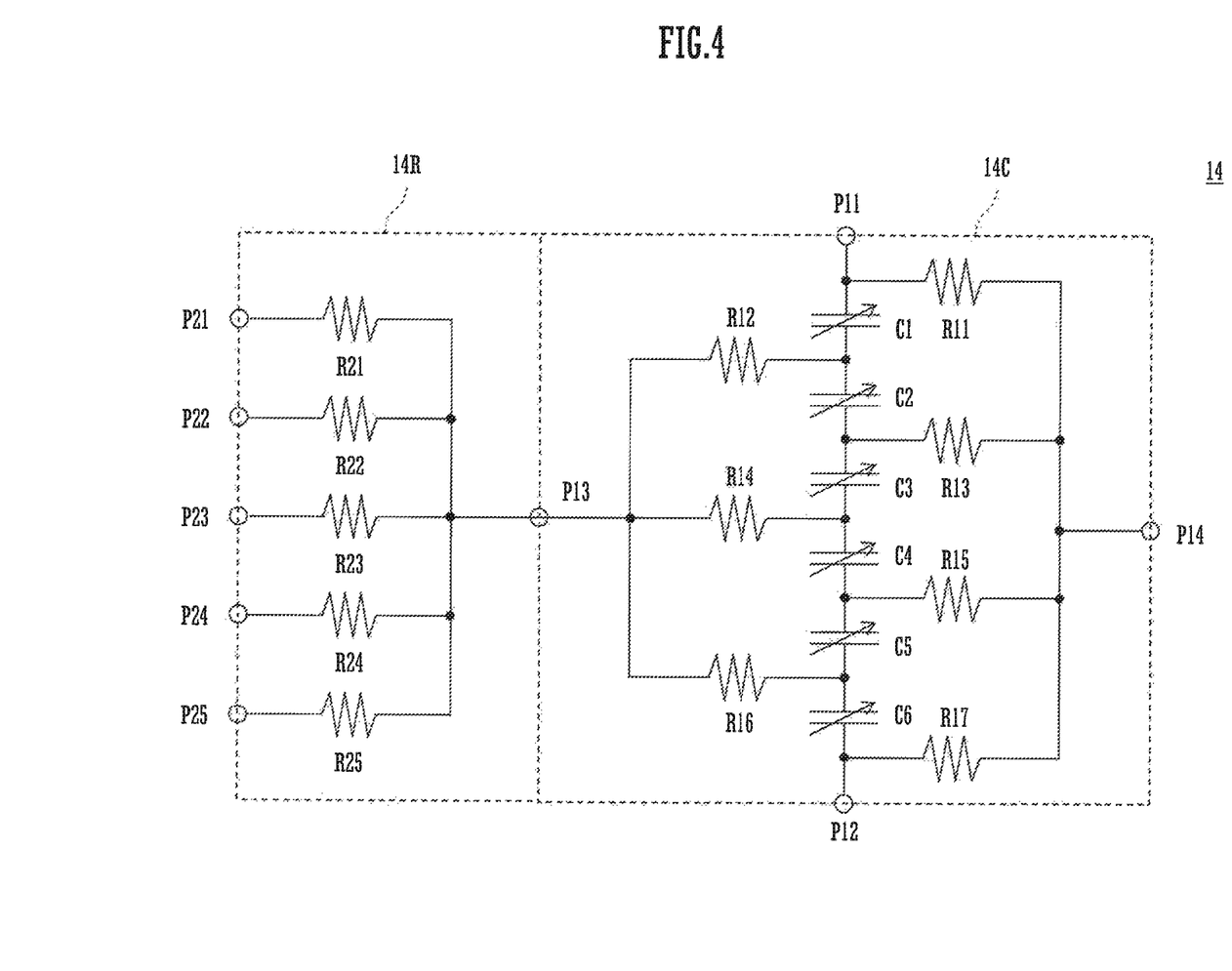
FIG. 4 is an entire circuit diagram within the variable capacitance element 14.

FIG. 4 is an entire circuit diagram within the variable capacitance element 14. The configuration of the control voltage application circuit 14R is as shown in FIG. 3. The variable capacitance unit 14C is preferably configured by capacitance elements C1-C6 and resistance elements R11-R17. Ports P21-P25 of the control voltage application circuit 14R are connected to the IO terminals 11P of the RFIC 11 as shown in FIG. 3. The RFIC 11 selectively sets the IO terminals 11P as the GPIO ports to high level (source voltage) or low level (ground voltage). Therefore, each of the resistance elements R21-R25 works as a resistance voltage divider circuit according to the level of the corresponding IO terminal of the RFIC 11, and a control voltage according to its voltage dividing ratio and the source voltage is applied to the port P13 of the variable capacitance unit 14C. As the port P14 of the variable capacitance unit 14C is grounded, the control voltage is applied between the ports P13-P14 of the variable capacitance unit 14C. The effect of the voltage dividing will be described later in detail.

In the variable capacitance unit 14C, the control voltage is applied to both end terminals of each of the capacitance elements C1-C6 via the resistance elements R11-R17. The resistance elements R11-R17 preferably have the same or substantially the same resistance value. The RF resistance elements R11-R17 apply the control voltage to the capacitance elements C1-C6, and prevent an RF signal applied between the ports P11-P12 from leaking to the ports P13 and P14. Each of the capacitance elements C1-C6 preferably is a ferroelectric capacitor configured such that a ferroelectric film is sandwiched between opposing electrodes. As the ferroelectric film changes its amount of polarization depending on an intensity of an electric field to be applied to change an apparent dielectric constant, it is possible to determine the capacitance value by the control voltage.

Figure 5:
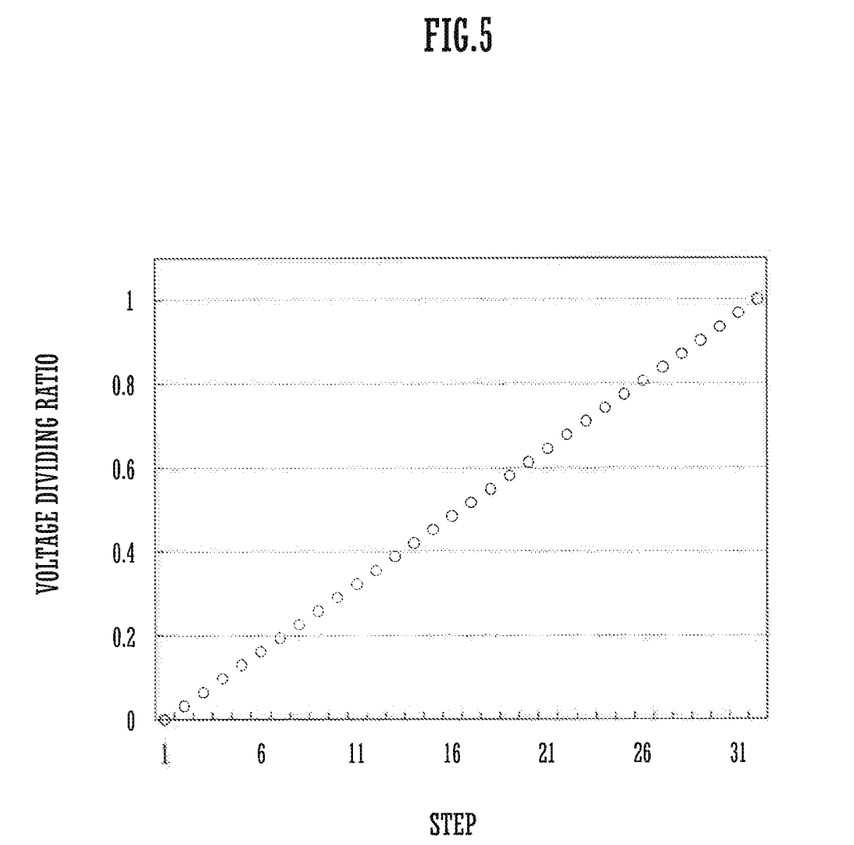
FIG. 5 is a chart showing a relationship between 5-bit values from ports P21-P25 shown in FIG. 4 and a resistance voltage dividing ratio.

FIG. 5 is a chart showing a relationship between 5-bit values from the ports P21-P25 shown in FIG. 4 and the resistance voltage dividing ratio. The resistance values of the resistance elements R21-R25 shown in FIG. 4 are determined to be in a ratio based on powers of 2 based on a lowest value among the resistance values. For example, the ratio between the resistance values of the resistance elements R21, R22, R23, R24, and R25 is determined to be, for example, approximately 1:2:4:8:16. For example, when R21 is about 10 kΩ, R22 is about 20 kΩ and R25 is about 160 kΩ.

For example, when the port P21 is high level and all of the ports P22-P25 are low level, the resistance element R21 constitutes an upper arm of the resistance voltage divider circuit, and a parallel circuit of the resistance elements R22-R25 constitutes a lower arm. Alternatively, for example, when the ports P21 and P22 are high level and the ports P23, P24, and P25 are low level, a parallel circuit of the resistance elements R21 and R22 constitutes the upper arm of the resistance voltage divider circuit, and a parallel circuit of the resistance elements R23-R25 constitutes the lower arm. In addition, as the resistance values of the resistance elements R21-R25 are determined to be in the ratio based on powers of 2 based on a lowest value among these resistance values, the resistance voltage dividing ratio may take values in the fifth power of 2 (=32) ways depending on the combination of the ports P21-P25 in high level or low level.

The horizontal axis in FIG. 5 may also be referred to as 5-bit values from the ports P21-P25. Similarly, the vertical axis may also be referred to as a voltage ratio to the source voltage.

Second Preferred Embodiment

Figure 6:
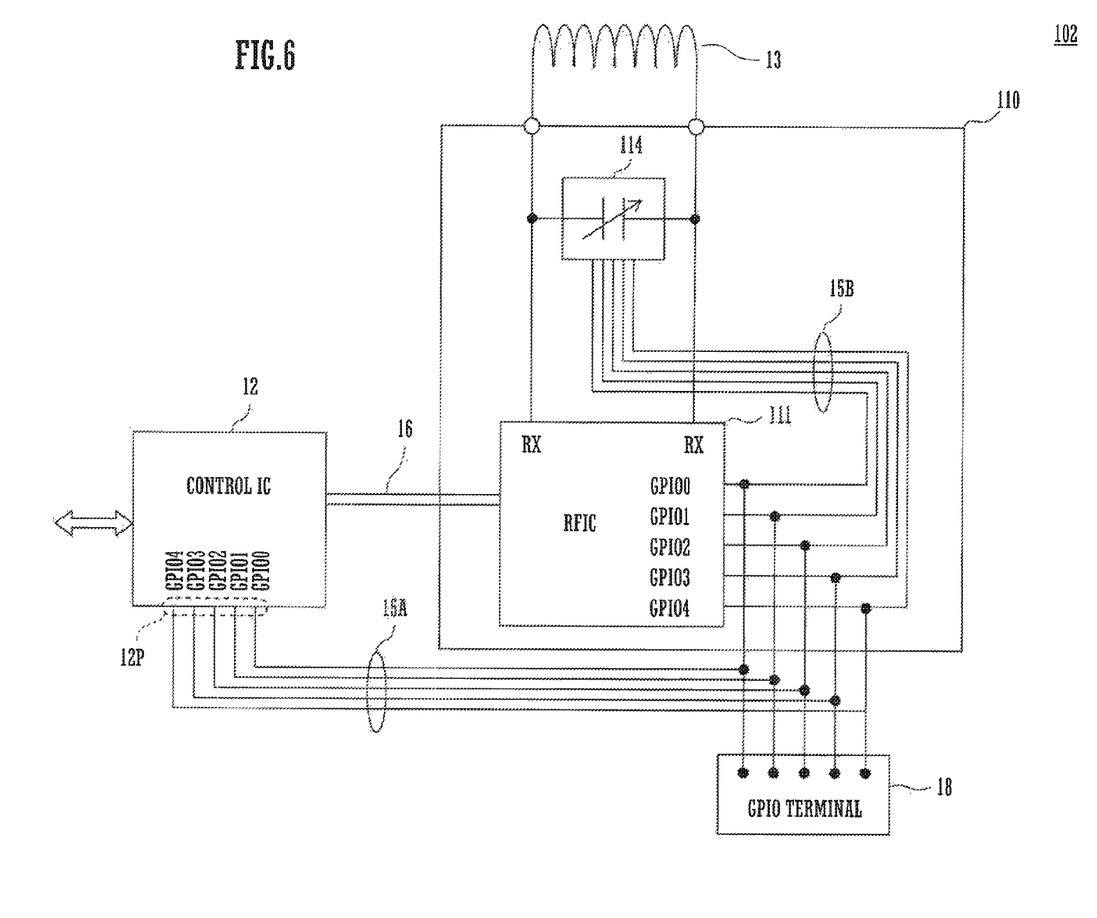
FIG. 6 is a circuit diagram of a communication circuit 102 according to a second preferred embodiment of the present invention.

FIG. 6 is a circuit diagram of a communication circuit 102 according to a second preferred embodiment of the present invention. The communication circuit 102 is one example of the NFC module. The communication circuit 102 includes an RFIC 111, a control IC 12, an antenna coil 13, and a variable capacitance element 114. In this example, the RFIC 111 and the variable capacitance element 114 are provided within a single RFIC (variable-capacitance-element built-in RFIC) 110. The variable-capacitance-element built-in RFIC 110 preferably is a monolithic IC in which a circuit unit of the RFIC 111 and a circuit unit of the variable capacitance element 114 are provided on an Si substrate through a series of semiconductor fabrication. With this configuration, the number of the components is significantly reduced, wiring of the data transmission lines are greatly simplified to a large extent, and thus the size and the weight of the communication circuit are greatly reduced.

Further, unlike the one described in the first preferred embodiment with reference to FIG. 1, the communication circuit 102 preferably is provided with GPIO terminals 18. To the GPIO terminals 18, signal lines 15A and 15B are connected. Therefore, it is possible to control the variable capacitance element by an external circuit. The GPIO terminals 18 are connected to, for example, a secure IC for RFID for receiving and transmitting data to and from the control IC 12 or the RFIC 111. Further, a device such as an LED controlled by the control IC 12 is connected.

Figure 7:
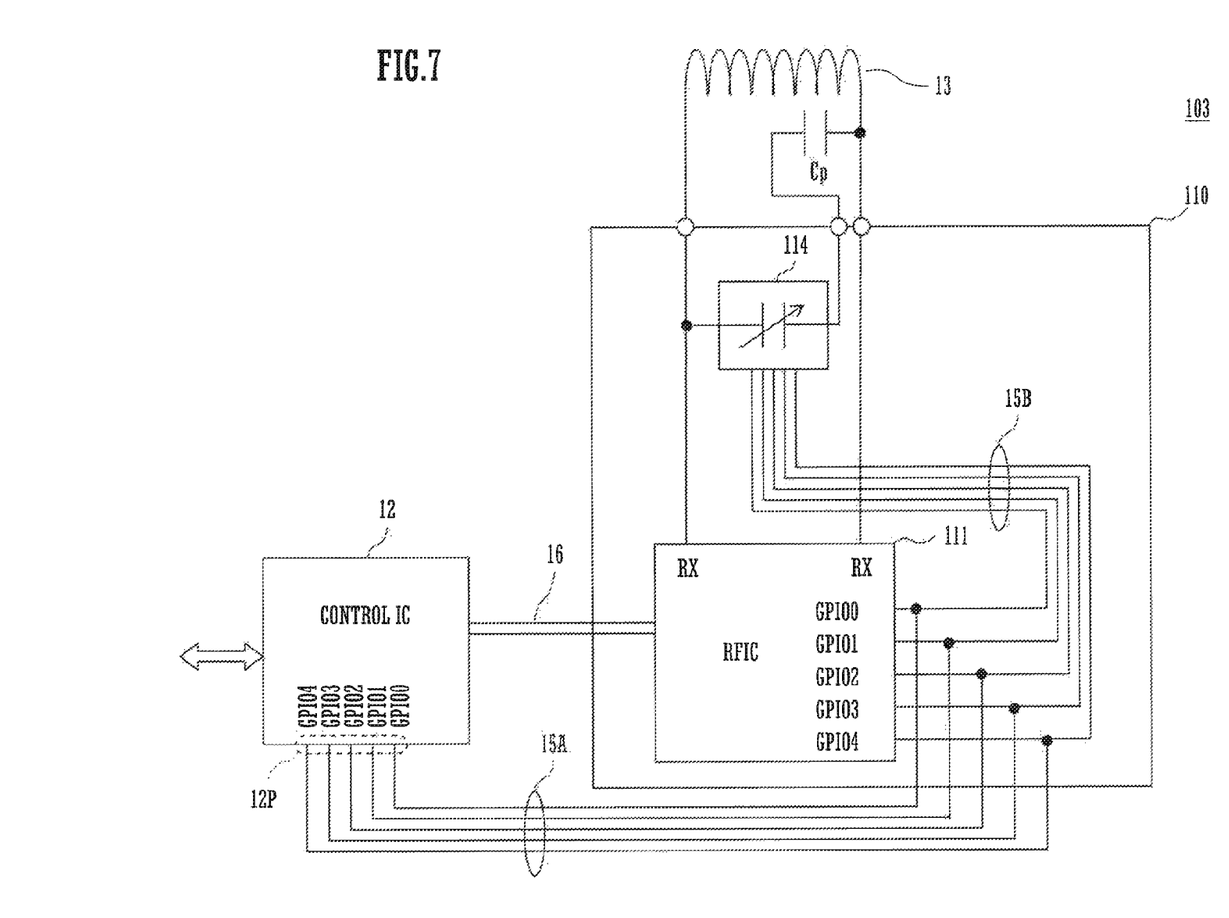
FIG. 7 is a circuit diagram of a different communication circuit 103 according to the second preferred embodiment of the present invention.

FIG. 7 is a circuit diagram of a different communication circuit 103 according to the second preferred embodiment. In this example, the RFIC 111 and the variable capacitance element 114 are provided within the single variable-capacitance-element built-in RFIC 110, and a static capacitance element Cp is connected in series to the variable capacitance element 114. The static capacitance element Cp is connected outside the variable-capacitance-element built-in RFIC 110.

A portion, instead of all, of the capacitance that is connected in parallel to the antenna coil 13 in this manner preferably defines the variable capacitance element. Further, a portion of the capacitance that is connected in parallel to the antenna coil 13 in this manner preferably is provided within the RFIC, and the remaining portion preferably is connected outside the IC. It should be noted that the variable capacitance element and the static capacitance element may preferably be connected in parallel. By providing a combined capacitance of a plurality of capacitance elements so as to be connected in parallel to the antenna coil 13, it is possible to significantly improve or optimize a characteristic of the change of the resonant frequency of the antenna circuit (impedance from the RFIC) with respect to the change of the control voltage.

Third Preferred Embodiment

Figure 8:
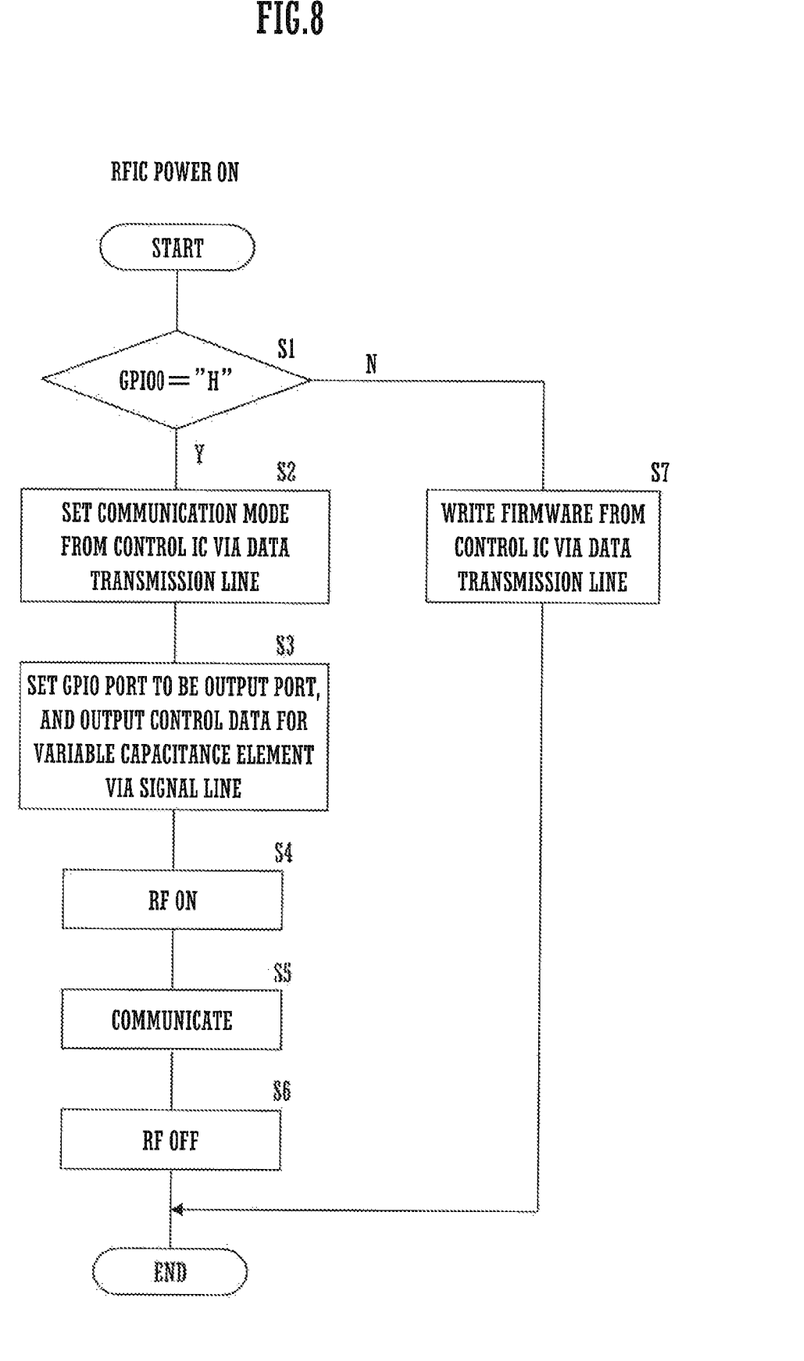
FIG. 8 is a flowchart of a processing of an RFIC provided for a communication circuit according to a third preferred embodiment of the present invention.

In a third preferred embodiment of the present invention, a processing of the RFIC (11 or 111) in the communication circuit described in one of the first preferred embodiment and the second preferred embodiment will be described. FIG. 8 is a flowchart of the processing. Upon turning the power of the RFIC on, the RFIC reads a state of GPIO0, which is one of the GPIO ports, and the processing branches according to its level. If the GPIO0 is high level, the RFIC receives data to set a communication protocol from the control IC via a data transmission line (see the data transmission lines 16 in FIG. 1), and sets the communication protocol (S1→S2). Then, the RFIC sets the GPIO port to be an "output port", and outputs the control data for the variable capacitance element via the signal line (S3). With this, the capacitance value of the variable capacitance element is set to a value corresponding to this control data. For example, the capacitance value of the variable capacitance element is adjusted depending on whether the communication circuit operates in the card mode or in the reader/writer mode. Then, the RFIC turns the power of the high-frequency circuit unit on, performs a series of communications, and then turns the power of the high-frequency circuit unit off (S4→S5→S6).

Further, if the state of the GPIO0 is low level, the RFIC receives data to write firmware from the control IC via the data transmission line, and writes the firmware of its own (the RFIC) (S1→S7).

As in this example, the IO ports that are used by the control IC to control the RFIC and the output port for the control data to control the capacitance value of the variable capacitance element are preferably configured as the same port, and thus it is possible to efficiently utilize a small number of IO ports.

Fourth Preferred Embodiment

In a fourth preferred embodiment of the present invention, the control of the variable capacitance element in the communication circuit described in one of the first preferred embodiment and the second preferred embodiment will be described.

Figure 9A:
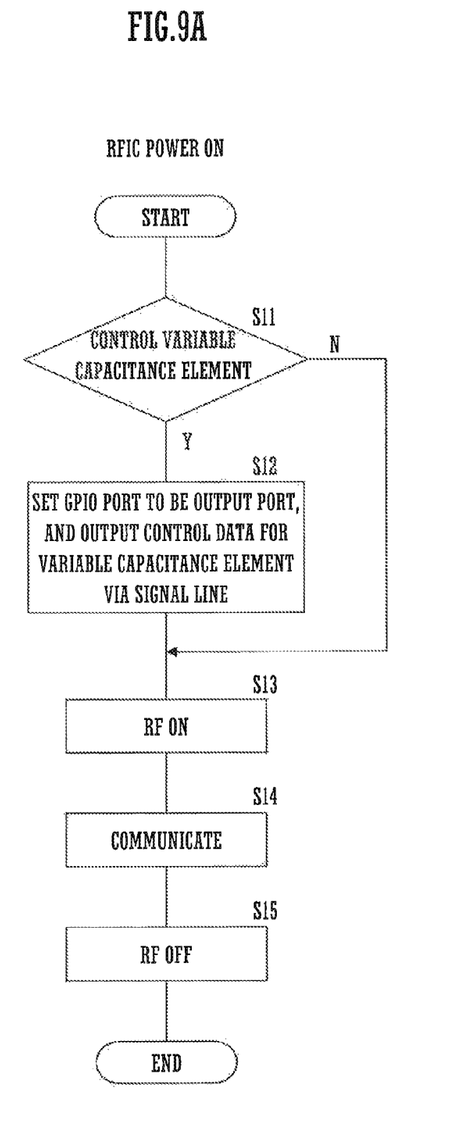
FIG. 9A is a flowchart of a processing of the RFIC.

FIG. 9A is a flowchart of the processing of the RFIC. Upon turning the power of the RFIC on, the RFIC determines whether or not the control of the variable capacitance element is to be performed by itself (the RFIC). If the RFIC is set such that it (the RFIC) is to perform the control, the RFIC sets the GPIO port to be the "output port", and outputs the control data for the variable capacitance element via the signal line (S11→S12). Then, the RFIC turns the power of the high-frequency circuit unit on, performs a series of communications, and then turns the power of the high-frequency circuit unit off (S13→S14→S15). If the RFIC is not set such that the control of the variable capacitance element is to be performed by itself (the RFIC), the RFIC performs communication directly (S11→S13→S14→S15).

Figure 9B:
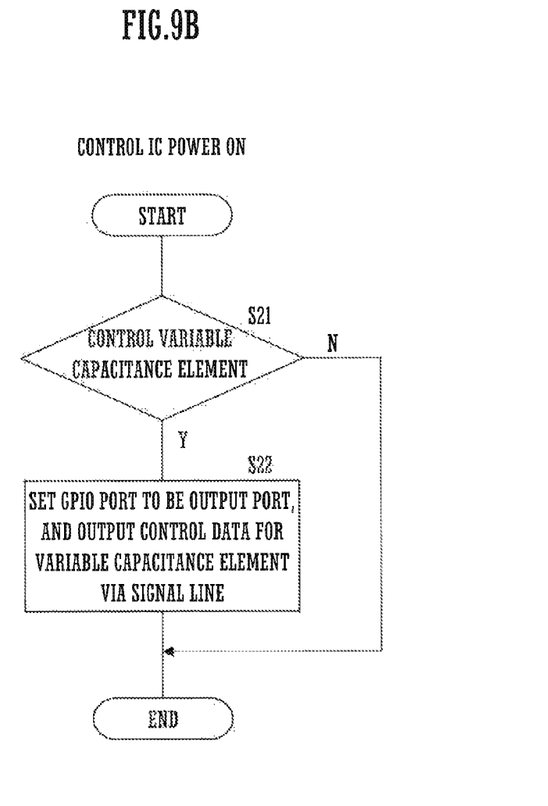
FIG. 9B is a flowchart of a processing of a control IC.

FIG. 9B is a flowchart of a processing of the control IC. Upon turning the power of the control IC on, the control IC determines whether or not the control of the variable capacitance element is to be performed by itself (the control IC). If the control IC is set such that it (the control IC) is to perform the control, the control IC sets the GPIO port to be the "output port", and outputs the control data for the variable capacitance element via the signal line (S21→S22).

Which one of the RFIC and the control IC is to control the variable capacitance element may be determined previously by the firmware of the RFIC or the control IC, or may be appropriately set according to the mode. For example, the control IC may perform tuning (absorption of production tolerance) of the capacitance value of the variable capacitance element in manufacturing, and the RFIC preferably significantly improves or optimizes the capacitance value of the variable capacitance element depending on the use conditions on the side of an assembly manufacturer.

In this manner, either of the RFIC and the control IC preferably supplies the control data to the variable capacitance element.

Other Preferred Embodiments

In the preferred embodiments described above, the example in which one of the RFIC and the control IC supplies the control data to the variable capacitance element has been described. However, both of the RFIC and the control IC may supply the control data to the variable capacitance element. For example, it is possible to use a configuration in which GPIO3 and GPIO4 of the GPIO ports of the control IC 12 shown in FIG. 1 are turned to high impedance and GPIO0-GPIO2 specify lower 3 bits of the 5-bit control data for the variable capacitance element 14, and GPIO0-GPIO2 of the GPIO ports of the RFIC 11 are turned to high impedance and GPIO3 and GPIO4 specify upper 2 bit of the 5-bit control data. With this, it is possible to realize control such that the RFIC 11 roughly adjusts the capacitance value of the variable capacitance element 14, and then the control IC 12 finely adjusts the capacitance value of the variable capacitance element 14. The relationship between the upper bits and the lower bits may be opposite.

Further, while the preferred embodiments described above preferably are configured such that the capacitance value of the variable capacitance element is set to be a certain value, it is possible to use a configuration in which the resonant frequency of the antenna circuit is swept, an error rate or the like of the communication data is detected, and the capacitance value of the variable capacitance element is automatically optimized based on the detected error rate, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication circuit comprising:
   an RFIC configured to perform modulation and demodulation between a baseband signal and a high-frequency signal;
   a control IC configured to control the RFIC by receiving and transmitting data including communication data;
   an antenna coil; and
   a variable capacitance element configured to change a resonant frequency of an antenna circuit including the antenna coil; wherein
   an IO terminal of the RFIC and an IO terminal of the control IC are connected by a signal line, and control terminals of the variable capacitance element are connected to at least a portion of the signal line;
   the variable capacitance element includes a capacitance element with a capacitance value that is determined according to a control voltage, and a resistance voltage divider circuit configured to generate the control voltage by dividing a voltage inputted to the control terminals; and
   the resistance voltage divider circuit includes a plurality of resistances each including a first terminal connected to each of the control terminals, and a common line to which second terminals of the resistances are connected in common and through which the control voltage is outputted, and resistance values of the plurality of resistances are determined to be in a ratio based on powers of 2 based on a lowest value among the resistance values.

2. The communication circuit according to claim 1, further comprising an external IO terminal connected to the signal line and configured to receive and transmit a signal from and to an external circuit.

3. The communication circuit according to claim 1, wherein the variable capacitance element and the RFIC are configured as a single monolithic IC.

4. The communication circuit according to claim 1, wherein the RFIC includes an operational mode switch configured to switch an operational mode of the RFIC based on a signal outputted from the IO terminal of the control IC when the RFIC is turned on.

5. The communication circuit according to claim 1, wherein one of the RFIC and the control IC is configured to determine a capacitance setting mode of the variable capacitance element when power is turned on, and both of the RFIC and the control IC are configured to output control data for the variable capacitance element to the IO terminal.

6. The communication circuit according to claim 1, wherein the RFIC and the control IC are connected to each other via data transmission lines.

7. The communication circuit according to claim 1, wherein the antenna circuit is an LC parallel resonance circuit.

8. The communication circuit according to claim 1, further comprising capacitors configured and arranged to adjust a degree of coupling between the RFIC and the antenna coil.

9. The communication circuit according to claim 1, wherein an impedance from the RFIC to the antenna coil is configured to change based on an operation mode of the communication circuit.

10. The communication circuit according to claim 1, further comprising electrostatic discharge elements connected between the antenna coil and ground.

11. The communication circuit according to claim 1, wherein the variable capacitance element includes a control voltage application circuit and a variable capacitance unit.

12. The communication circuit according to claim 11, wherein the control voltage application circuit includes resistance elements connected to the RFIC and in common.

13. The communication circuit according to claim 11, wherein the variable capacitance unit includes capacitance elements including a ferroelectric film between a pair of electrodes, and resistance elements having the same or substantially the same resistance value.

14. The communication circuit according to claim 3, wherein the single monolithic IC includes a Si substrate including a circuit unit of the RFIC and a circuit unit of the variable capacitance element provided thereon.

15. The communication circuit according to claim 3, further comprising a static capacitance element connected in series to the variable capacitance element.

16. The communication circuit according to claim 1, wherein one of the RFIC and the control IC is configured to output control data for the variable capacitance element to the IO terminal.

17. A Radio Frequency Identification system comprising the communication circuit according to claim 1.

18. A Near Field Communication system comprising the communication circuit according to claim 1.

* * * * *